US012663343B2

(12) United States Patent
Han et al.

(10) Patent No.: US 12,663,343 B2
(45) Date of Patent: Jun. 23, 2026

(54) SCANNING DEVICE FOR AN AIR FILTER

(71) Applicant: Camfil AB, Stockholm (SE)

(72) Inventors: Lim Boon Han, Ipoh Perak (MY); Xin Chen, Shanghai (CN); Keith Woolard, Washington, NC (US); Kwang Chueng Lee, Singapore (SG); Aaron Warner, Washington, NC (US)

(73) Assignee: Camfil AB, Stockholm (SE)

( * ) Notice: Subject to any disclaimer, the term of this patent is extended or adjusted under 35 U.S.C. 154(b) by 427 days.

(21) Appl. No.: 18/387,617

(22) Filed: Nov. 7, 2023

(65) Prior Publication Data

US 2024/0159627 A1      May 16, 2024

(30) Foreign Application Priority Data

Nov. 16, 2022      (CN) ......................... 202211436196.X

(51) Int. Cl.
*G01N 1/22* (2006.01)
*B01D 46/00* (2022.01)

(52) U.S. Cl.
CPC ....... *G01N 1/2247* (2013.01); *B01D 46/0086* (2013.01); *B01D 2273/18* (2013.01)

(58) Field of Classification Search
CPC ......... G01N 1/2247; G01N 2001/2291; G01N 2015/084; G01N 15/08; G01N 15/0806; B01D 46/0086; B01D 2273/18; G01M 3/00; G01M 3/02
See application file for complete search history.

(56) References Cited

U.S. PATENT DOCUMENTS

| | | | |
|---|---|---|---|
| 7,320,249 B2 * | 1/2008 | Georgeson | G01N 29/28 73/644 |
| 2016/0097705 A1 * | 4/2016 | Woolard | G01M 3/205 73/38 |

* cited by examiner

*Primary Examiner* — Tarun Sinha
(74) *Attorney, Agent, or Firm* — McDonald Hopkins LLC

(57) ABSTRACT

A scanning device for an air filter being arranged to be mounted in a circular duct, comprising: a driving unit and a sampling unit, wherein the driving unit comprises an inner magnetic member and an inner magnetic member support element and an outer magnetic member and a circular guiding rail wherein the sampling unit comprises a central rotation axis and a probe nozzle, the probe nozzle is driven to rotate around the central rotation axis by a force of attraction between the inner magnetic member and the outer magnetic member.

11 Claims, 9 Drawing Sheets

SCANNING DEVICE FOR AN AIR FILTER

CROSS-REFERENCE TO RELATED APPLICATION

This application claims priority to and the benefit of Chinese Patent Application No. 202211436196.X, filed on Nov. 16, 2022, which is incorporated herein in its entirety by reference.

FIELD OF THE INVENTION

The present invention generally relates to scanning device for filter, and, more particularly, to a scanning device for an air filter in a circular duct.

BACKGROUND OF THE INVENTION

When air in venting spaces might contain hazardous matter, in the form of small particles, droplets of even gaseous compounds, the air in the venting spaces is filtered by means of appropriate types of air filters. For instance, a circular duct having an air filter arranged inside of it, is mounted as a portion of a venting pipe. It is important that such an air filter is not leaking. In order not to have to exchange the filter unnecessarily often it is regularly scanned on its downstream side to ensure that it has no leakage.

Current scanning mechanisms are usually driven by a gear. FIGS. 1A to 1C show an example of the current scanning device. According to the figures, the scanning device is provided with a wheel outside the circular duct for actuating the scanning operation, and a gear is provided inside the circular duct together with some linkages between the wheel and the gear, a scanning probe attached to a rotating shaft is connected with the gear. When the gear is driven by the wheel to move, the rotating shaft together with the scanning probe are driven by the gear to rotate, such to realize full scanning of the air filter inside the duct. However, the structure of the scanning mechanism is complicated since many assembly parts are needed for the system and the connection between them is complicated, thus the assembly of the scanning device takes much time. Another disadvantage is that the system is vulnerable because of the wear and tear of the assembly parts, especially the gear. A third disadvantage is the cost of producing the scanning device is high, and a last disadvantage is, since all the assembly parts are loose during transportation of the system, it is difficult to pack these components and there is also a risk of losing components during transportation.

Thus, there is a need for improving the scanning device with a compact structure and is robust, at the same time bring down the product cost and reducing the risk of losing components during transportation.

SUMMARY OF THE INVENTION

In the light of the above, it is of interest to provide alternative solutions in order to improve the structure and robustness of the scanning device. These and other objects are achieved by providing a scanning device for air filter being arranged to be mounted in a circular duct having the features in the independent claims. Preferred embodiments are defined in the dependent claims.

Hence, according to an aspect of the present invention, there is provided a scanning device for an air filter being arranged to be mounted in a circular duct, wherein the scanning device comprises: a driving unit and a sampling unit, wherein the driving unit comprises an inner magnetic member arranged inside of the circular duct, an outer magnetic member and a circular guiding rail arranged outside of the circular duct, and an inner magnetic member support element. The sampling unit comprises a central rotation axis and a probe nozzle, the probe nozzle being arranged to be rotatable about the central rotation axis, the central rotation axis being positioned at the center of the circular guiding rail. The inner magnetic member support element is attached to the sampling unit and extends in a radius direction of the circular duct, and the inner magnetic member is arranged at an end of the inner magnetic member support element close to an inner surface of the circular duct. The outer magnetic member is engaged with the circular guiding rail and is arranged adjacent to the inner magnetic member at an outer surface of the circular duct, such that the probe nozzle is driven to rotate around the central rotation axis by a force of attraction between the inner magnetic member and the outer magnetic member by displacement of the outer magnetic member along the circular guiding rail when the scanning device is actuated.

Thus, the present invention is based on an idea of providing a scanning device which is driven by a magnetic force. The complexity of the structure of the scanning device is significantly reduced, therefore the cost of producing the scanning device is much lower than that in the prior art.

According to an embodiment of the present invention, the outer magnetic member is arranged to be engaged with the circular guiding rail on the outer side of the circular guiding rail such that the outer magnetic member is guided to move along the circular guiding rail when being displaced.

According to an embodiment of the present invention, the scanning device further comprises a secure mechanism for securing the outer magnetic member to be in place.

According to an embodiment of the present invention, the secure mechanism comprises a secure chain, wherein one end of the secure chain is arranged on the outer magnetic member, and wherein the other end is configured to be attachable to the outer side of the circular duct, such that the outer magnetic member is secured to be in place.

According to an embodiment of the present invention, the circular guiding rail comprises a base rail and a guiding rail, the base rail being attached to the circular duct and being arranged to provide support to the guiding rail, the outer magnetic member being arranged to be engaged with the guiding rail on the inner side of the guiding rail such that the outer magnetic member is guided to move along the guiding rail when being displaced.

According to an embodiment of the present invention, the outer magnetic member comprises a nonmagnetic block enclosing a magnet inside.

According to an embodiment of the present invention, the scanning device further comprises a rotating shaft rotatable around the central rotation axis and the probe nozzle being attached to the rotating shaft.

According to an embodiment of the present invention, the scanning device further comprises a shaft fixing sub-unit for rotatably connecting the rotating shaft to a sampling tube, wherein the shaft fixing sub-unit comprises a shaft alignment block, a shaft holding bar and at least one shaft locking member.

According to an embodiment of the present invention, the scanning device further comprises a sampling port for outputting samples from the circular duct for analysis.

According to an embodiment of the present invention, the probe nozzle has an inlet opening extending in the radial direction of the circular duct.

The present invention has the advantages of having compact structure with robustness. Furthermore, since the scanning device has a compact structure, loosen components are avoided and the risk of losing component parts is reduced.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1A:
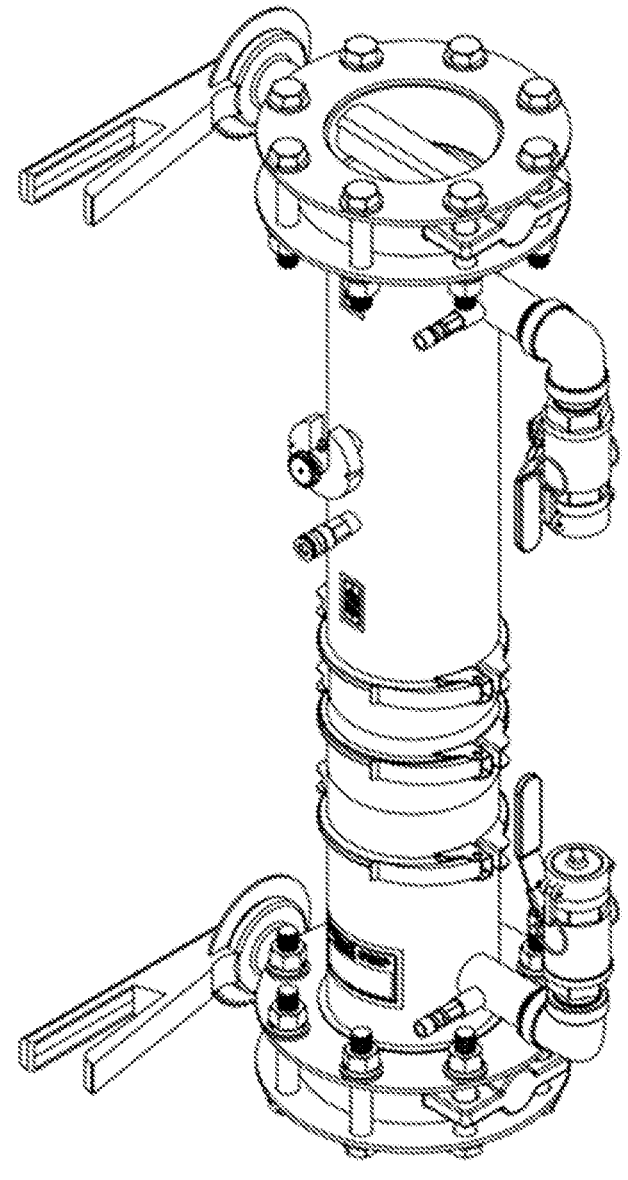
FIG. 1A schematically shows an overview of a scanning device mounted on a circular duct of a venting pipe according to prior art, FIG. 1B schematically shows a detailed part view of the scanning device mounted on a circular duct of a venting pipe according to the prior art, FIG. 1C schematically shows a detailed structure of the scanning device according to the prior art, FIG. 2A schematically shows an overview of the scanning device mounted on a circular duct of a venting pipe according to a first embodiment of the present invention, FIG. 2B schematically shows a detailed part view of the scanning device mounted on a circular duct of a venting pipe according to the first embodiment of the present invention, FIG. 2C schematically shows a front view of a detailed structure of the scanning device according to the first embodiment of the present invention, FIG. 2D schematically shows a rear view of the detailed structure of the scanning device according to the first embodiment of the present invention, FIG. 2E schematically shows an exploded view of the detailed structure of the scanning device according to the first embodiment of the present invention, FIG. 3A schematically shows an overview of the scanning device mounted on a circular duct of a venting pipe according to a second embodiment of the present invention, FIG. 3B schematically shows a detailed part view of the scanning device mounted on a circular duct of a venting pipe according to the second embodiment of the present invention, FIG. 3C schematically shows a front view of a detailed structure of the scanning device according to the second embodiment of the present invention, FIG. 3D schematically shows a left rear view of the detailed structure of the scanning device according to the second embodiment of the present invention, FIG. 3E schematically shows a right rear view of the detailed structure of the scanning device according to the second embodiment of the present invention, FIG. 3F schematically shows an exploded view of the detailed structure of the scanning device according to the second embodiment of the present invention.
Figure 1B:
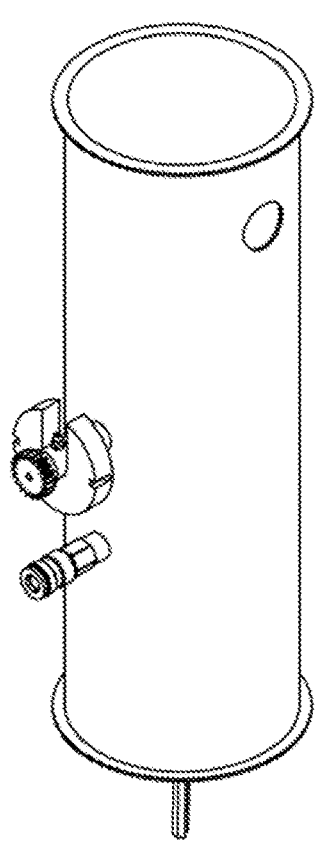
Figure 1C:
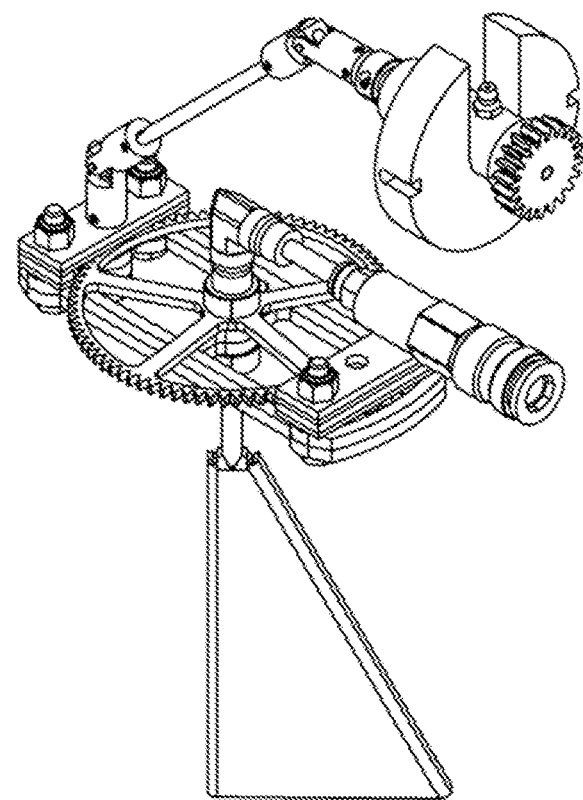
Figure 2A:
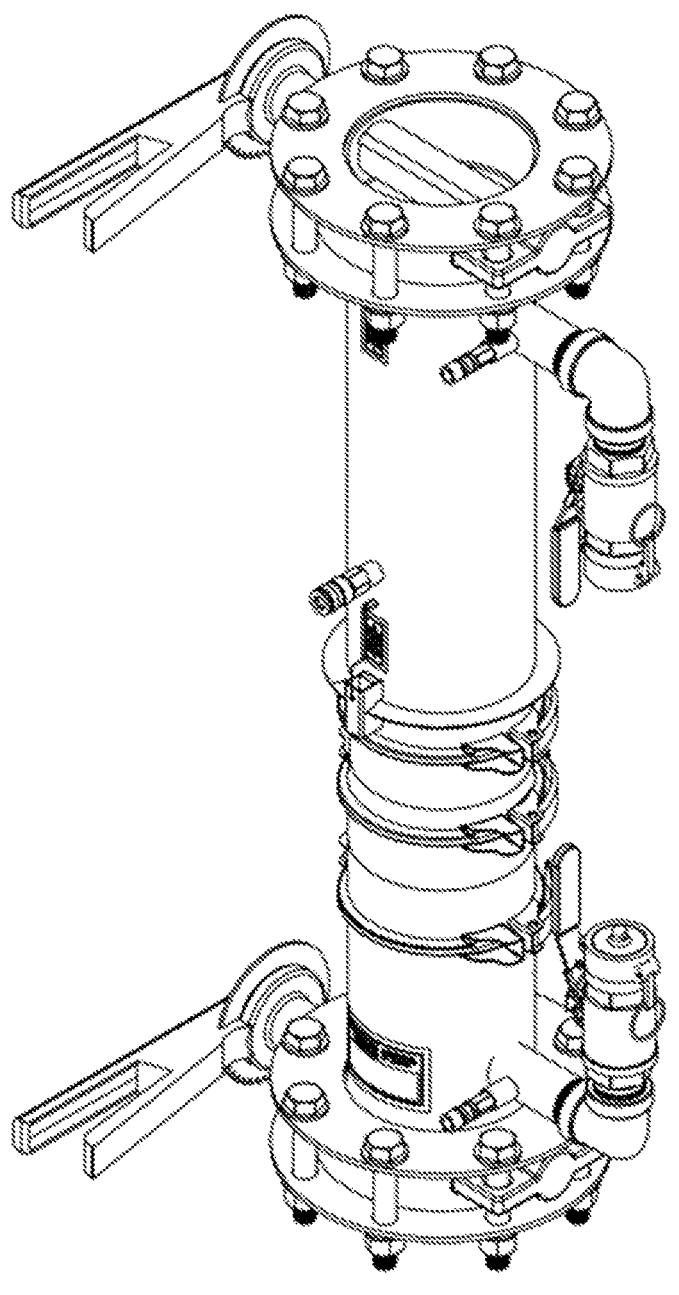
Figure 2B:
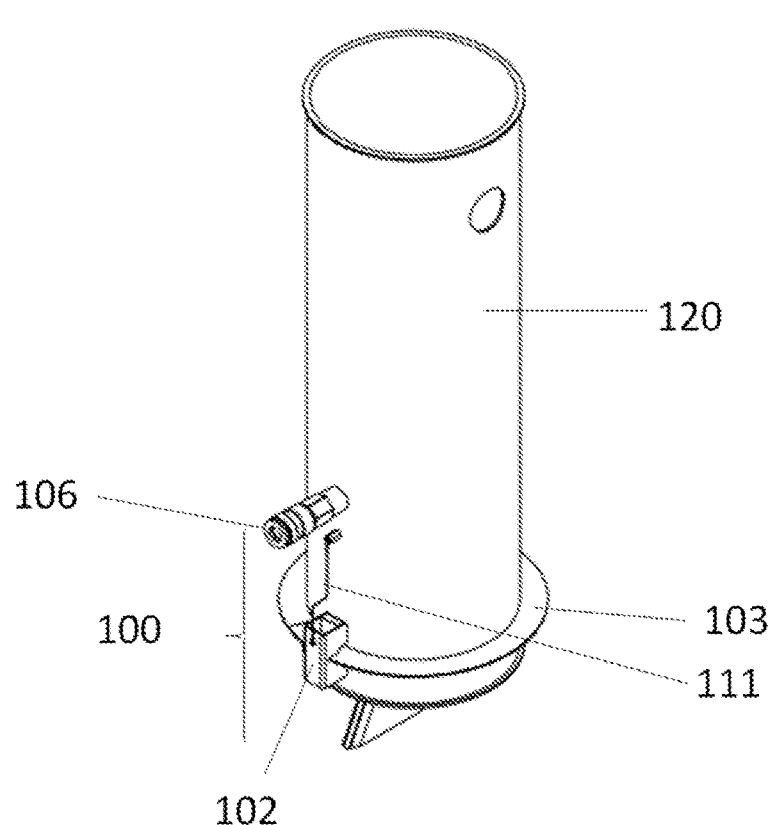

FIG. 2A schematically shows an overview of the scanning device 100 mounted on a circular duct 120 of a venting pipe according to a first embodiment of the present invention, FIG. 2B schematically shows a detailed part view of the scanning device 100 mounted on a circular duct 120 of a venting pipe according to the first embodiment of the present invention. It can be seen from the figures that when the scanning device 100 is mounted on the circular duct 120, only a guiding rail 103, an outer magnetic member 102 and a sampling port 106 is exposed at the outer side of the duct 120. Other parts of the system are mounted inside the duct 120 which will be described in the following. According to some embodiments, a secure mechanism may be provided in the scanning device 100 to ensure the outer magnetic member 102 not to be lost.

Figure 2C:
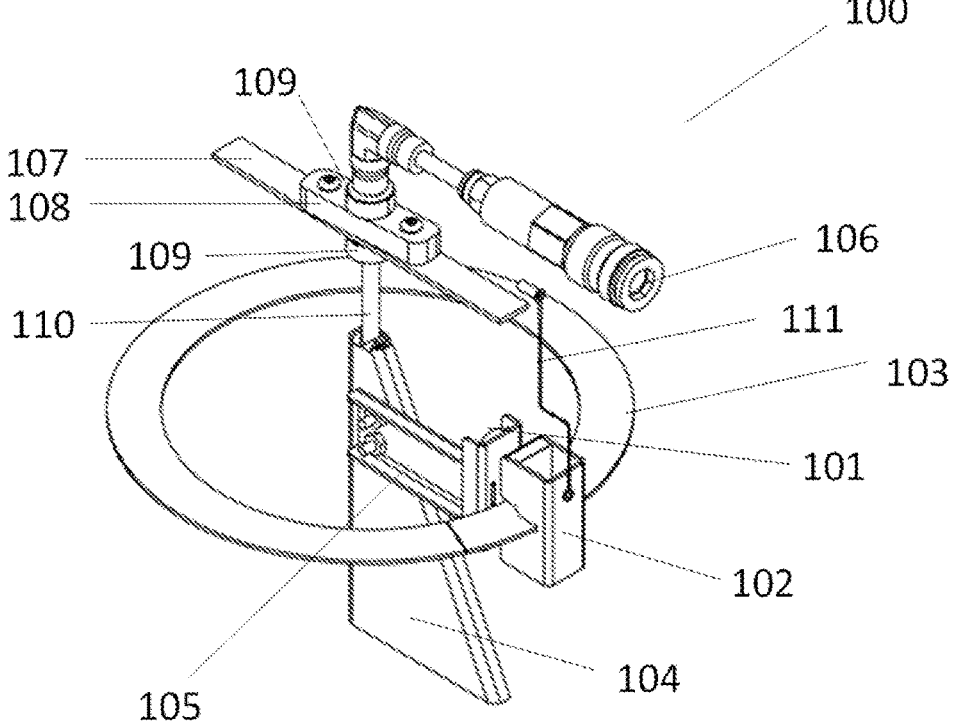
Figure 2D:
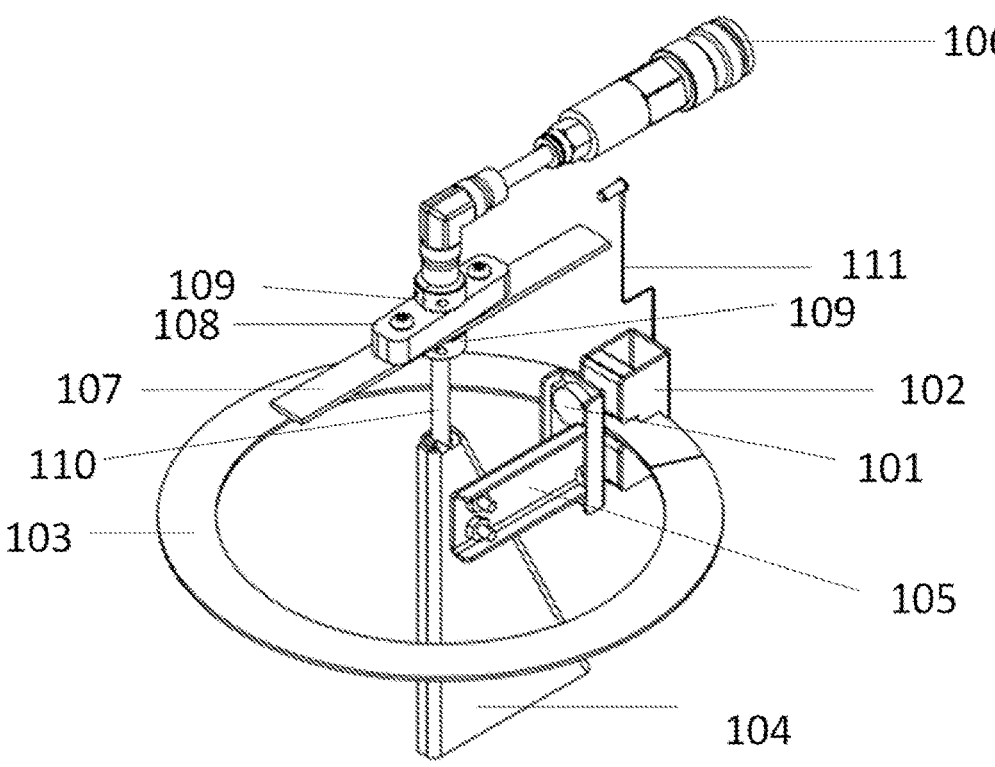
Figure 2E:
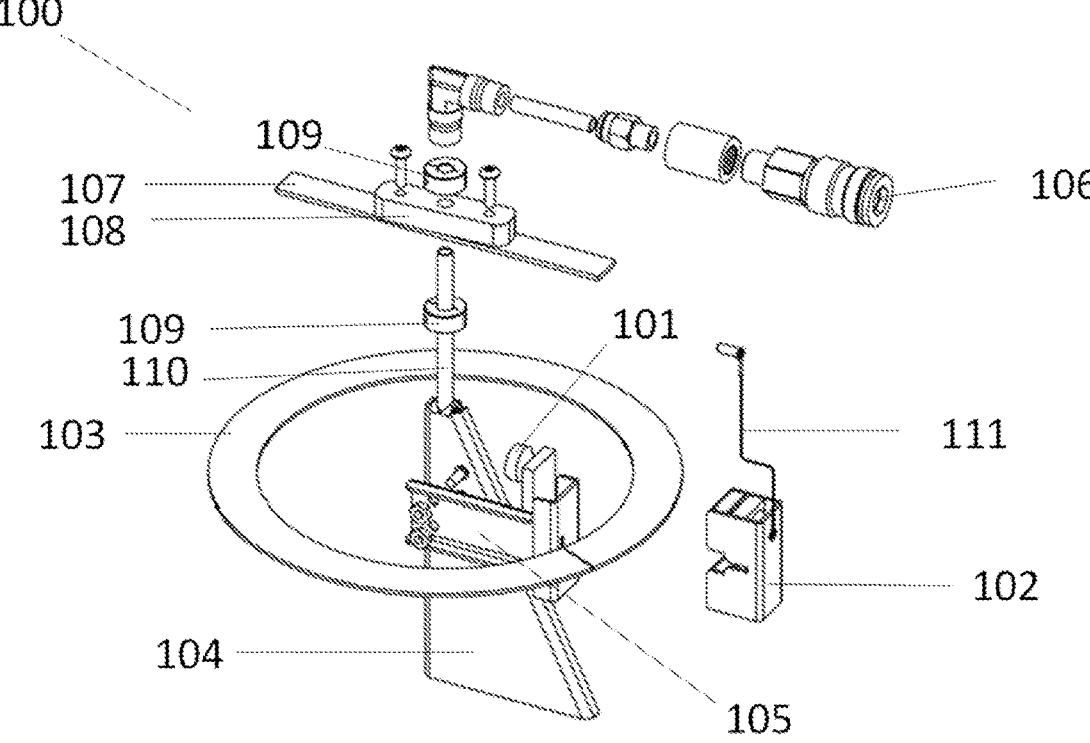

FIG. 2C schematically shows a front view of the detailed structure of the scanning device 100 according to the first embodiment of the present invention, FIG. 2D schematically shows a rear view of the detailed structure of the scanning device 100 according to the first embodiment of the present invention, and FIG. 2E schematically shows an exploded view of the detailed structure of the scanning device 100 according to the first embodiment of the present invention. The detailed structure of the scanning device 100 according to the first embodiment will be elaborated in the following in combination with FIGS. 2C to 2E. To show the structure of the scanning device 100 clearly, the circular duct 120 is not shown in FIGS. 2C to 2E.

The scanning device 100 comprises a driving unit and a sampling unit. The driving unit comprises an inner magnetic member 101, an outer magnetic member 102, a circular guiding rail 103 and an inner magnetic member support element 105. According to some embodiments, the inner magnetic member 101 and the outer magnetic member 102 are magnets. The inner magnetic member 101 is arranged inside the circular duct 120 of the venting pipe, and the outer magnetic member 102 and the circular guiding rail 103 are arranged outside of the circular duct 120 of the venting pipe.

The sampling unit comprises a probe nozzle 104 and a central rotation axis positioned at the center of the circular guiding rail 103, the probe nozzle 104 is arranged to be rotatable about the central rotation axis. According to some embodiments, the probe nozzle 104 may comprise an inlet opening extending in the radial direction of the circular duct 120. The probe nozzle 104 may be designed in any suitable shape. According to some embodiments, the probe nozzle 104 has a shape of triangle or quadrilateral or polygon with one side extending in the radial direction of the circular duct 120.

The inner magnetic member 101 is supported by the inner magnetic member support element 105 which is attached to the sampling unit and extends in a radius direction of the circular duct 120, and the inner magnetic member 101 is arranged at an end of the inner magnetic member support element 105 close to an inner surface of the circular duct 120 of the venting pipe. The inner magnetic member support element 105 may be attached to the probe nozzle 104. The outer magnetic member 102 is engaged with the circular guiding rail 103 on the outer side of the circular guiding rail 103 at an outer surface of the circular duct 120, such that the outer magnetic member 102 is guided to move along the circular rail 103 when being displaced. According to some embodiments, the outer magnetic member 102 is provided with a recess for receiving the circular guiding rail 103, such that the outer magnetic member 102 moves along the circular rail 103 when being displaced.

When the scanning device 100 is actuated, the outer magnetic member 102 moves along the circular guiding rail 103 and the inner magnetic member 101 is driven to move together with the outer magnetic member 102 by a force of attraction between the inner magnetic member 101 and the outer magnetic member 102, thus drives the probe nozzle 104 to rotate about the central rotation axis, thereby a full scanning of the air filter is performed by the probe nozzle 104. According to some embodiments, the scanning device 100 may be manually actuated. According to some other embodiments, the scanning device 100 may be actuated by a motor.

According to some embodiments, the scanning device 100 may further comprise a rotating shaft 110. The rotating shaft 110 is arranged to be rotatable about the central rotation axis and the probe nozzle 104 is attached to the rotating shaft 110. According to some embodiments (not shown), the inner magnetic member support element 105 may be attached to the rotating shaft 110.

Accordingly, there is provided a shaft fixing sub-unit for rotatably connecting the rotating shaft 110 to a sampling tube. According to some embodiments, the shaft fixing sub-unit may comprise a shaft alignment block 108 for aligning the rotating shaft 110 with the central rotation axis, a shaft holding bar 107 for holding the rotating shaft 110 in place and at least one shaft locking member 109 for locking the rotating shaft 110. According to some embodiments, the shaft alignment block 108 and the shaft holding bar 107 are arranged between two shaft locking members 109 such that the rotating shaft 110 is aligned with the shaft alignment block 108 and connected with the sampling tube. The connection between the rotating shaft 110 and the sampling tube may be any suitable type of connection such as air-tight connection thereby the rotating shaft 110 is freely rotatable about the central rotation axis without any restriction of the connection between the rotating shaft 110 and the sampling tube, therefore reducing the wear and tear of the components and increasing the robustness of the device.

According to some embodiments, the scanning device 100 may further comprise a secure mechanism for securing the outer magnetic member 102 to be in place such that the outer magnetic member 102 does not fall away from the circular guiding rail 103, thus to avoid losing the outer magnetic member 102 during transportation or installation. According to some further embodiments, the secure mechanism may comprise a secure chain 111, one end of the secure chain 111 is attached to the outer magnetic member 102 and the other end of the secure chain 111 is attachable to the outer side of the circular duct 120 such that the outer magnetic member 102 is secure to be in place. According to some embodiments, the secure chain 111 is arranged to be detachable from the outer side of the circular duct 120.

Figure 3A:
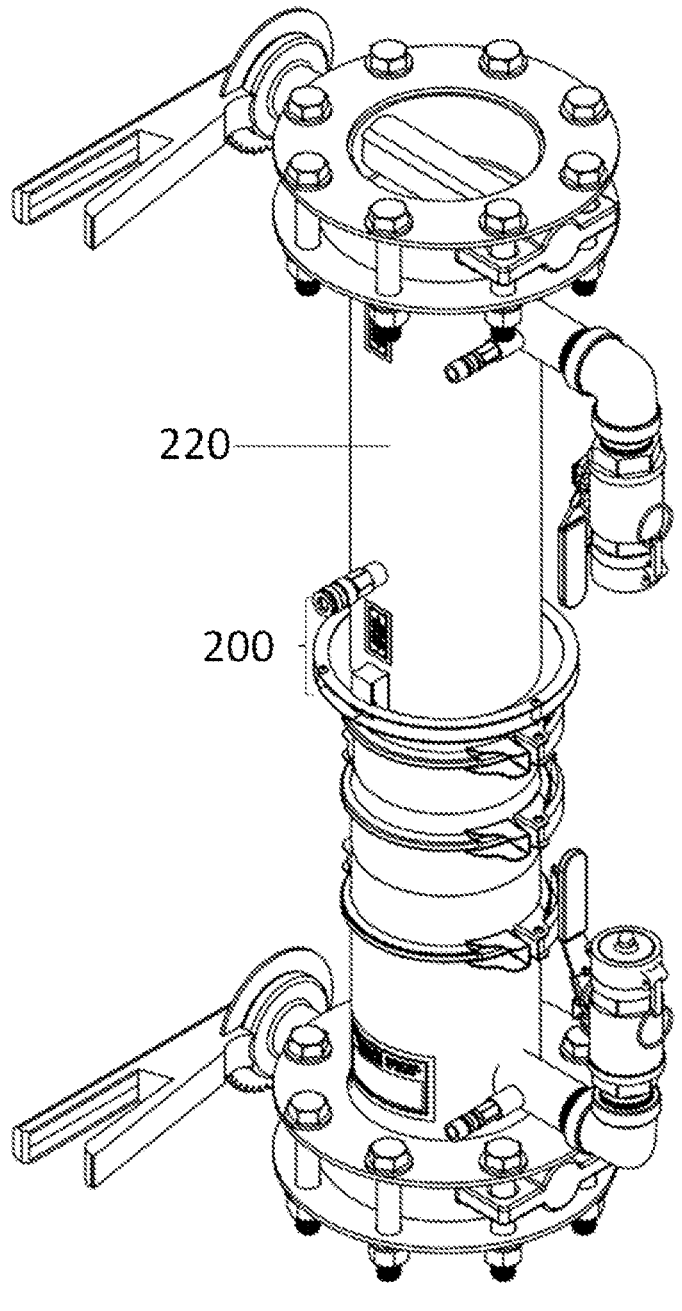
Figure 3B:
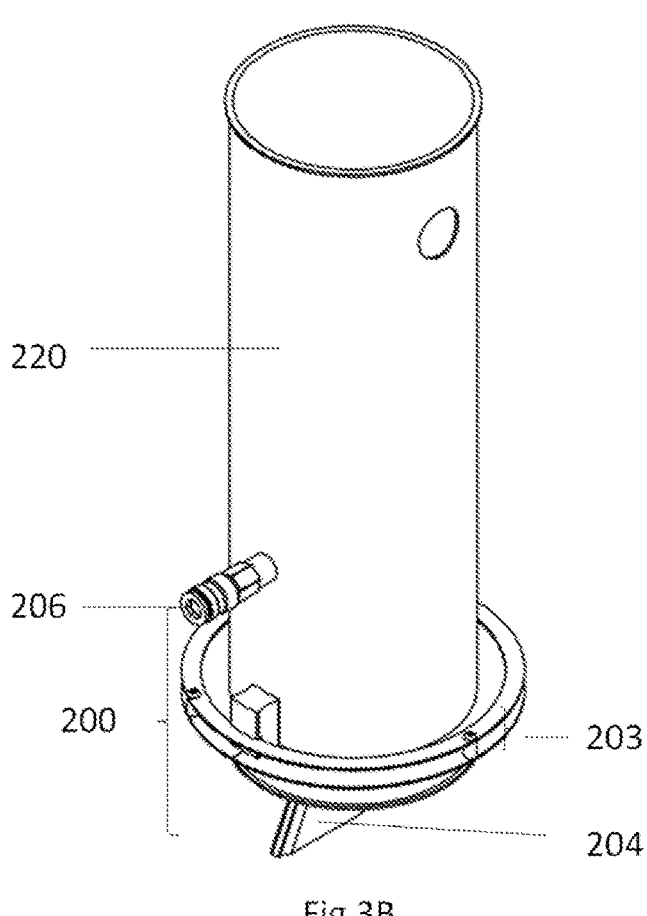

FIG. 3A schematically shows an overview of the scanning device 200 mounted on a circular duct 220 of a venting pipe according to a second embodiment of the present invention, FIG. 3B schematically shows a detailed part view of the scanning device 200 mounted on a circular duct 220 of a venting pipe according to the second embodiment of the present invention. It can be seen from the figures that most parts of the scanning device 200 is the same as the scanning device 100 in the first embodiment. The only differences are the arrangement of the outer magnet member 202 and the circular guiding rail 203 which will be described in detail in the following.

Figure 3C:
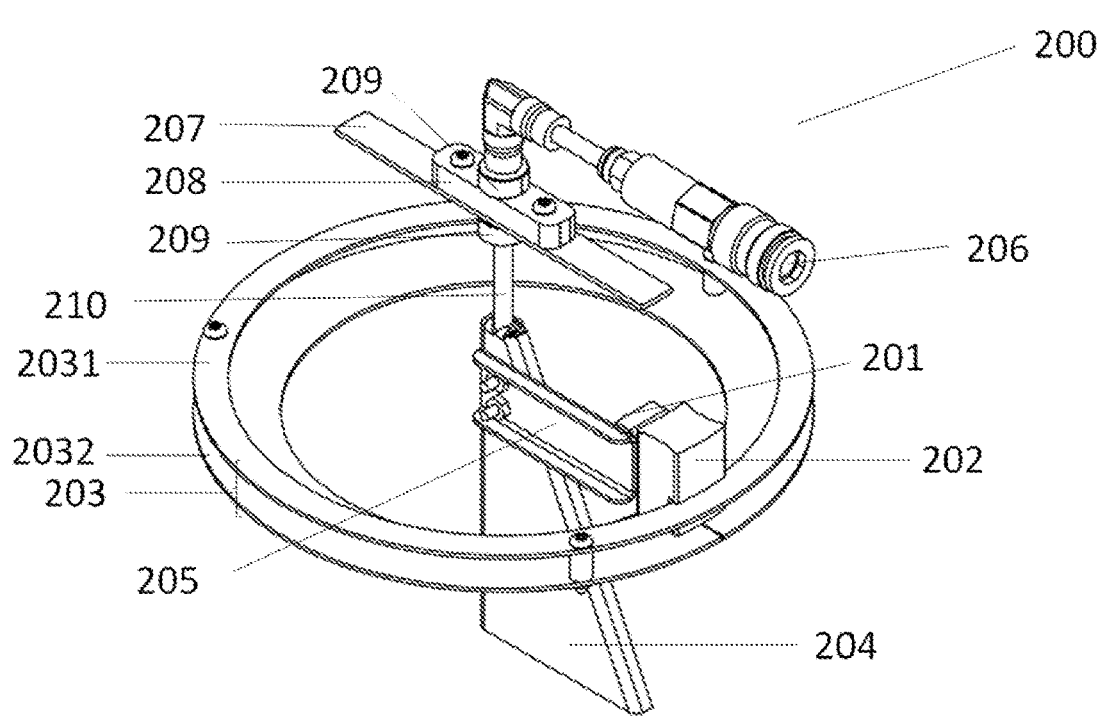
Figures 3D, 3E:
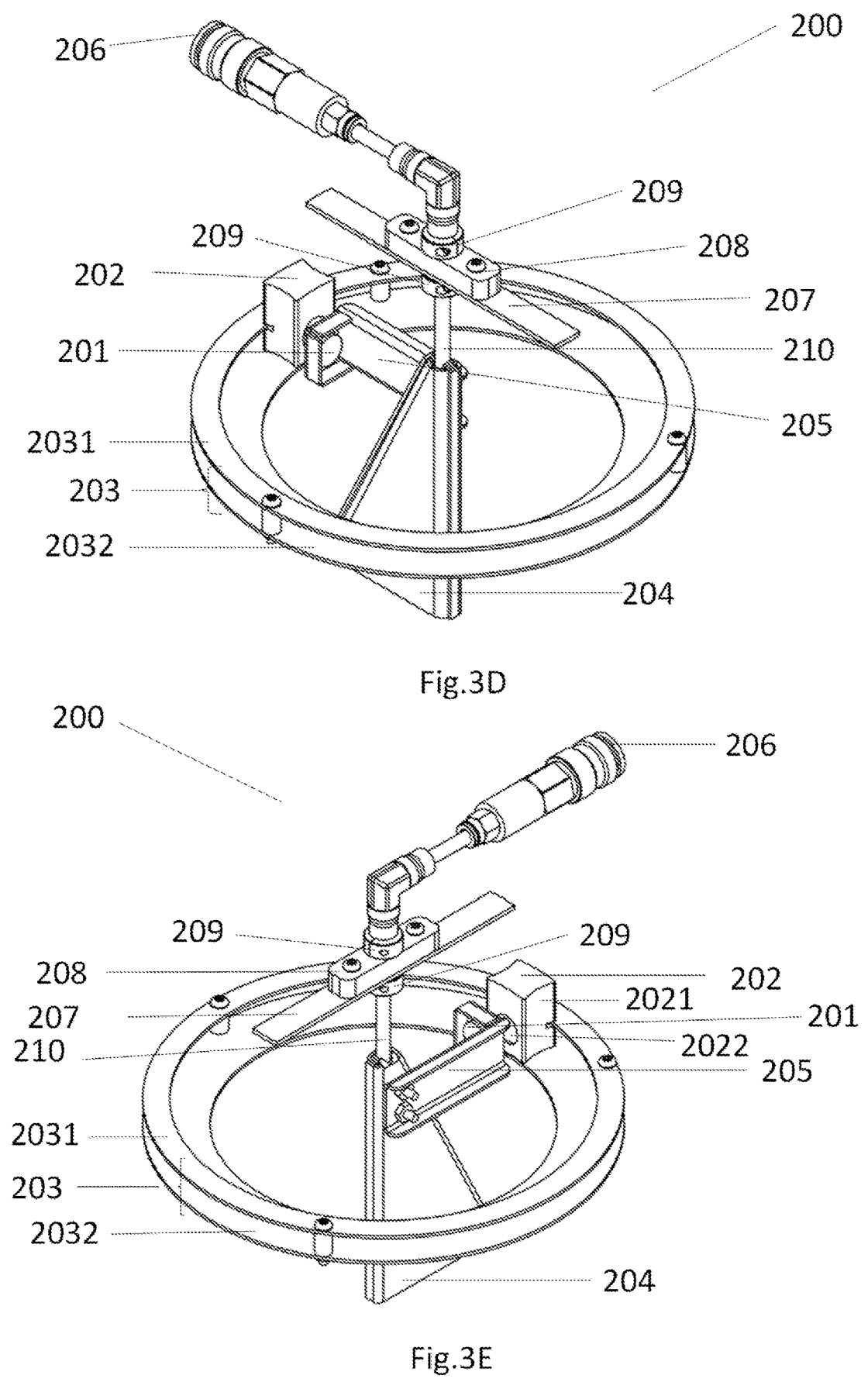
Figure 3F:
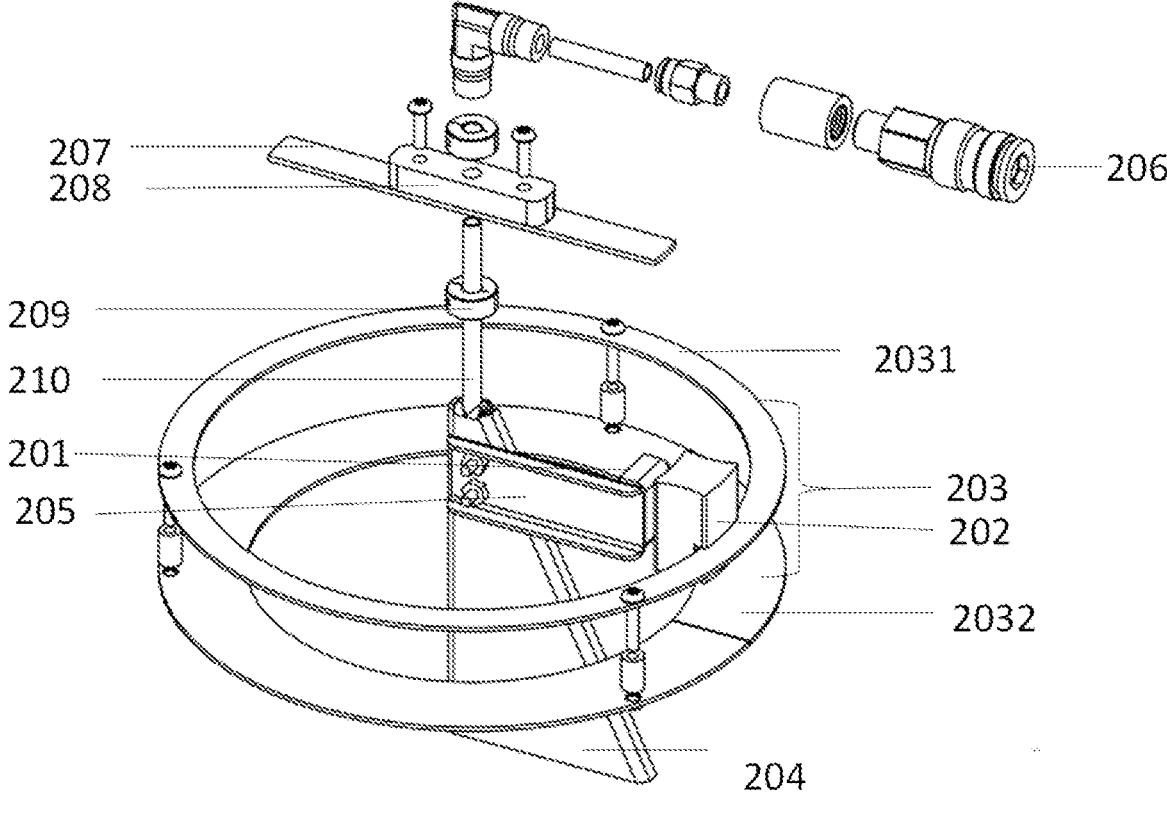

FIG. 3C schematically shows a front view of the detailed structure of the scanning device 200 according to the second embodiment of the present invention, FIG. 3D schematically shows a left rear view of the detailed structure of the scanning device 200 according to the second embodiment of the present invention, FIG. 3E schematically shows a right rear view of the detailed structure of the scanning device 200 according to the second embodiment of the present invention and FIG. 3F schematically shows an exploded view of the detailed structure of the scanning device 200 according to the second embodiment of the present invention. The detailed structure of the scanning device 200 according to the second embodiment will be elaborated in the following in combination with FIGS. 3C to 3F.

As elaborated above, the scanning device 200 according to the second embodiment comprises the driving unit and the sampling unit. The driving unit comprises the inner magnetic member 201, the outer magnetic member 202, the circular guiding rail 203 and the inner magnetic member support element 205. When the scanning device 200 is mounted on the circular duct 220 of the venting pipe, the inner magnetic member 201 is arranged inside the circular duct 220 of the venting pipe, and the outer magnetic member 202 and the circular guiding rail 203 are arranged outside of the circular duct 220 of the venting pipe.

The sampling unit comprises the probe nozzle 204 and the central rotation axis positioned at the center of the circular guiding rail 203, the probe nozzle 204 is arranged to be rotatable about the central rotation axis.

As described above, most parts of the structure and the principle of driving the probe nozzle 204 are the same as that in the first embodiment, which means the inner magnetic member 201 is supported by the inner magnetic member support element 205 which is attached to the sampling unit and extends in the radius direction of the circular duct 220, the inner magnetic member 201 is arranged at an end of the inner magnetic member support element 205 close to the inner surface of the circular duct 220 of the venting pipe.

According to some embodiments, the outer magnetic member 202 is engaged with the circular guiding rail 203 on the inner side of the circular guiding rail 203 at the outer surface of the circular duct 220, such that the outer magnetic member 202 is guided to move along the circular rail 203 when being displaced.

According to some embodiments, the inner magnetic member 201 is a magnet and the outer magnetic member 202 comprises a nonmagnetic block 2021, such as a plastic block, preferably a polymer block, enclosing a magnet 2022 inside.

According to some embodiments, the circular guiding rail 203 is arranged to be attached to the outside wall of the circular duct 220, the outer magnetic member 202 is arranged to be engaged with the guiding rail 203 on the inner side of the guiding rail 203 such that the outer magnetic member 202 is guided to move along the guiding rail 203 when being displaced.

According to some further embodiments, the circular guiding rail 203 comprises a base rail 2032 and a guiding rail 2031. The base rail 2032 is attached to the circular duct 220 and arranged to provide support to the guiding rail 2031. According to some embodiments, the base rail 2032 and the guiding rail 2031 may be connected by screws, such that the base rail 2032 may provide solid support to the guiding rail 2031. The outer magnetic member 202 is engaged with the guiding rail 2031 on the inner side of the guiding rail 2031 such that the outer magnetic member 202 is guided to move along the guiding rail 2031 when it is displaced. According to some embodiments, the outer magnetic member 202 is provided with a recess for receiving the guiding rail 2031, such that the outer magnetic member 202 moves along the circular rail 2031 when being displaced. Since the outer magnetic member 202 is placed between the outer side of the circular duct 220 and the inner guiding rail 2031, the outer magnetic member 202 cannot be removed from the scanning device 200 accidentally or intentionally, thus in this embodiment, the secure mechanism in the first embodiment is not needed in the scanning device 200. According to some other embodiments, the base rail 2032 may be arranged to be wider than that guiding rail 2031, such that the base rail 2032 may provide support to the outer magnetic member 202.

The arrangement of the rotating shaft 110, the shaft fixing sub-unit, the sampling port 106 and the probe nozzle 104 in the first embodiment may also be applied to the rotating shaft 210, the shaft fixing sub-unit, the sampling port 206 and the probe nozzle 204 in this second embodiment according to some embodiments.

As described in above two embodiments, since the scanning device 100, 200 is driven by the magnetic force instead of the gear mechanism, the complexity of the structure of the scanning device is significantly reduced and the cost of producing the device is lowered. Since the scanning device in the two embodiments has a compact structure, loosen component parts are reduced during the transportation of the scanning device and there is lower risk of losing component parts of the scanning device.

The person skilled in the art realizes that the present invention by no means is limited to the preferred embodiments described above. On the contrary, many modifications and variations are possible within the scope of the appended claims.

The invention claimed is:

1. A scanning device for an air filter being arranged to be mounted in a circular duct, comprising:
   a driving unit and a sampling unit, wherein
   the driving unit comprises an inner magnetic member and an inner magnetic member support element arranged inside of the circular duct and an outer magnetic member and a circular guiding rail arranged outside of the circular duct,
   wherein the sampling unit comprises a central rotation axis and a probe nozzle, the probe nozzle being rotatable about the central rotation axis, the central rotation axis being positioned at the center of the circular guiding rail,
   the inner magnetic member support element being attached to the sampling unit and extending in a radius direction of the circular duct,
   the inner magnetic member being arranged at an end of the inner magnetic member support element close to an inner surface of the circular duct,
   the outer magnetic member being engaged with the circular guiding rail, being arranged adjacent to the inner magnetic member at an outer surface of the circular duct, such that the probe nozzle is driven to rotate around the central rotation axis by a force of attraction between the inner magnetic member and the outer magnetic member by displacement of the outer magnetic member along the circular guiding rail when the scanning device is actuated.

2. The scanning device for an air filter according to claim 1, wherein the outer magnetic member is arranged to be engaged with the circular guiding rail on an outer side of the circular guiding rail such that the outer magnetic member is guided to move along the circular guiding rail when being displaced.

3. The scanning device for an air filter according to claim 2, further comprising a secure mechanism for securing the outer magnetic member to be in place.

4. The scanning device for an air filter according to claim 3, wherein the secure mechanism comprises a secure chain, wherein one end of the secure chain is arranged on the outer magnetic member, and wherein the other end is configured to be attachable to an outer side of the circular duct, such that the outer magnetic member is secured to be in place.

5. The scanning device for an air filter according to claim 1, the circular guiding rail being arranged to be attached to an outside wall of the circular duct, and the outer magnetic member being arranged to be engaged with the guiding rail on an inner side of the guiding rail such that the outer magnetic member is guided to move along the guiding rail when being displaced.

6. The scanning device for an air filter according to claim 5, wherein the circular guiding rail comprises a base rail and a guiding rail, the base rail being attached to the circular duct and being arranged to provide support to the guiding rail, the outer magnetic member being arranged to be engaged with the guiding rail on an inner side of the guiding rail such that the outer magnetic member is guided to move along the guiding rail when being displaced.

7. The scanning device for an air filter according to claim 5 wherein the outer magnetic member comprises a nonmagnetic block and a magnet, wherein the nonmagnetic block is arranged to enclose the magnet inside.

8. The scanning device for an air filter according to claim 1, further comprising a rotating shaft rotatable around the central rotation axis, the probe nozzle being attached to the rotating shaft.

9. The scanning device for an air filter according to claim 8, further comprising a rotating shaft fixing sub-unit for rotatably connecting the rotating shaft to a sampling tube, wherein the rotating shaft fixing sub-unit comprises a rotating shaft alignment block, a rotating shaft holding bar and at least one rotating shaft locking member.

10. The scanning device for an air filter according to claim 9, further comprising a sampling port for outputting samples from the circular duct for analysis.

11. The scanning device for an air filter according to claim 1, wherein the probe nozzle has an inlet opening extending in a radial direction of the circular duct.

* * * * *